US011423171B2

(12) United States Patent
Booth, Jr. et al.

(10) Patent No.: US 11,423,171 B2
(45) Date of Patent: Aug. 23, 2022

(54) PROTECTION OF PRIVACY AND DATA ON SMART EDGE DEVICES

(71) Applicant: Intel Corporation, Santa Clara, CA (US)

(72) Inventors: Lawrence A. Booth, Jr., Phoenix, AZ (US); Salessawi Ferede Yitbarek, Hillsboro, OR (US); Reshma Lal, Portland, OR (US); Pradeep M. Pappachan, Tualatin, OR (US); Brent D. Thomas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 16/725,187

(22) Filed: Dec. 23, 2019

(65) Prior Publication Data
US 2020/0134230 A1    Apr. 30, 2020

(51) Int. Cl.
| | |
|---|---|
| H04L 29/06 | (2006.01) |
| G06F 21/62 | (2013.01) |
| G06F 21/31 | (2013.01) |
| G06F 16/783 | (2019.01) |
| G06F 16/14 | (2019.01) |
| G06F 21/44 | (2013.01) |

(52) U.S. Cl.
CPC ........ *G06F 21/6245* (2013.01); *G06F 16/152* (2019.01); *G06F 16/783* (2019.01); *G06F 21/31* (2013.01); *G06F 21/44* (2013.01); *G06F 2221/0751* (2013.01)

(58) Field of Classification Search
CPC ...... G06F 16/783; G06F 16/152; G06F 21/31; G06F 21/44
See application file for complete search history.

(56) References Cited

U.S. PATENT DOCUMENTS

| | | | | |
|---|---|---|---|---|
| 2004/0260950 A1* | 12/2004 | Ougi | ......................... | H04L 9/16 726/1 |
| 2015/0254463 A1* | 9/2015 | Ryhorchuk | ......... | H04L 63/0442 713/156 |

(Continued)

FOREIGN PATENT DOCUMENTS

| | | |
|---|---|---|
| CN | 113032763 A | 6/2021 |
| DE | 102020126182 | 6/2021 |

*Primary Examiner* — Jason K Gee
(74) *Attorney, Agent, or Firm* — Jaffery Watson Mendonsa & Hamilton LLP

(57) ABSTRACT

Embodiments are directed to protection of privacy and data on smart edge devices. An embodiment of an apparatus includes a sensor to produce a stream of sensor data; an analytics mechanism; and a trusted execution environment (TEE) including multiple keys for data security, the apparatus to exchange keys with a host server to establish one or more secure communication channels between the apparatus and a TEE on a host server, process the stream of sensor data utilizing the analytics mechanism to generate metadata, perform encryption and integrity protection of the metadata utilizing a key from the TEE for the sensor, sign the metadata utilizing a private key for the analytics mechanism, and transfer the encrypted and integrity protected metadata and the signature to the host server via the one or more secure communication channels in a manner that prevents privileged users on the host from accessing the data.

13 Claims, 7 Drawing Sheets

(56) References Cited

U.S. PATENT DOCUMENTS

| | | | | |
|---|---|---|---|---|
| 2017/0187696 A1* | 6/2017 | Ahuja | ............... | H04L 67/2809 |
| 2018/0375638 A1* | 12/2018 | Khanna | ................ | H04L 9/002 |
| 2020/0014691 A1* | 1/2020 | Ortiz | .................... | H04L 63/10 |
| 2020/0387611 A1* | 12/2020 | Yao | .................... | G06F 21/572 |

* cited by examiner

PROTECTION OF PRIVACY AND DATA ON SMART EDGE DEVICES

TECHNICAL FIELD

Embodiments described herein generally relate to the field of electronic devices and, more particularly, protection of privacy and data on smart edge devices.

BACKGROUND

Smart edge devices, such as smart cameras, may collect large amounts of privacy sensitive data. Transmitting and processing these streams of data on a host computer can expose sensitive data to privileged users and compromised software. Data may conventionally be protected for transmission and storage, such as through use of known cryptographic operations on such data.

However, to prevent a privileged user or compromised system software from accessing or tampering with privacy sensitive data generated by an edge device, it may be insufficient to enforce confidentiality and integrity of the data only when the data is in transit over a network or while the data is at rest in a storage device. Such data may also be subject to attack on the edge and in backend servers, which would not be protected by the conventional security means. The encryption of data and metadata in transmission and storage thus provide only limited protection for privacy sensitive data.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
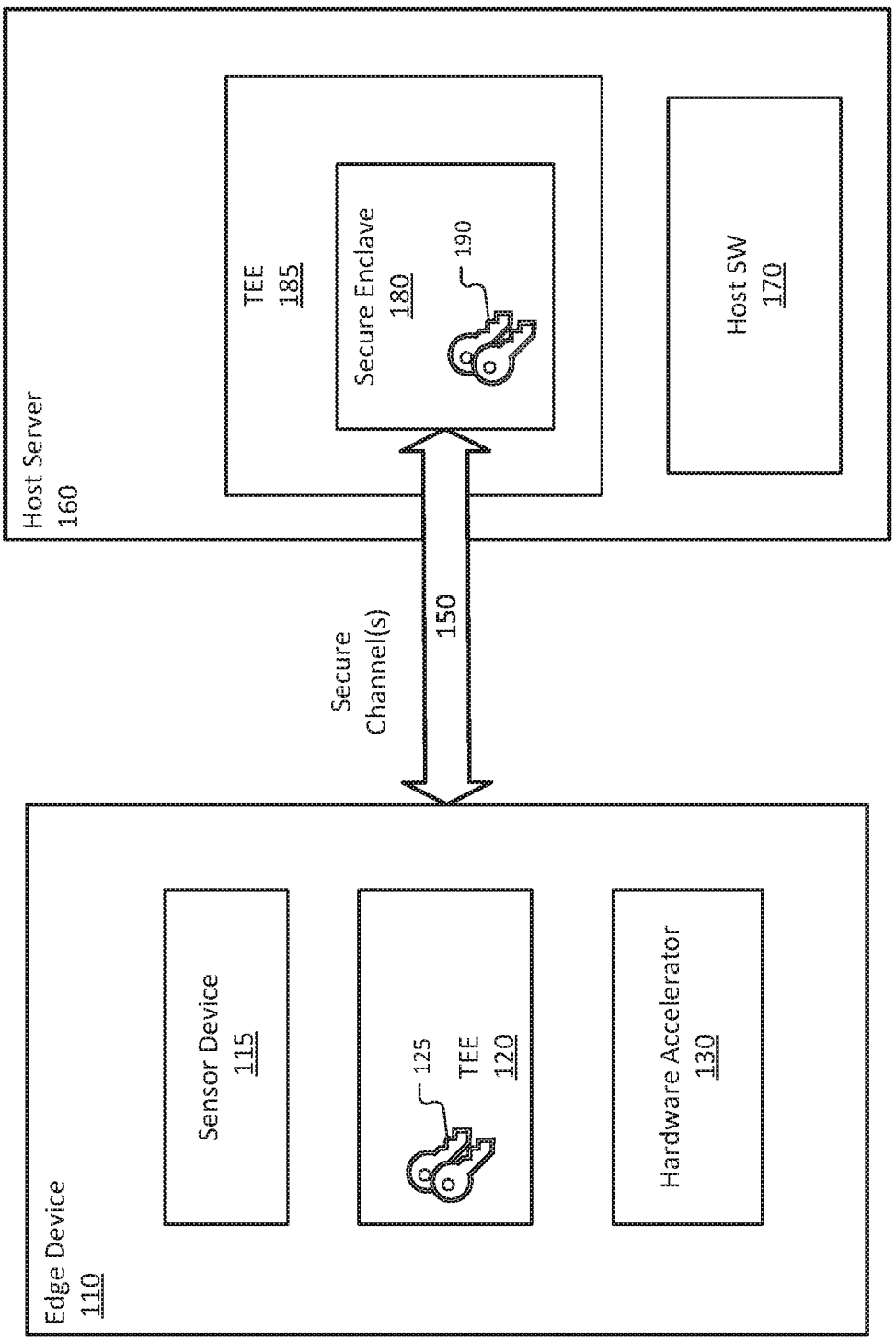
FIG. 1 is an illustration of a system architecture to provide data security for smart edge devices according to some embodiments.

Embodiments described herein are directed to protection of privacy and data on smart edge devices.

There are existing proprietary systems today that provide some level of confidentiality and integrity protection for edge device operations in, for example, video capture and storage. Standard implementations encrypt data transmitted over a network but terminate this protection in the network driver software where the streams are decrypted. This type of implementation tacitly assumes that Ring 0 software elements (Ring 0, or kernel mode, being the software level with the highest level of privileges, and having the most direct access to resources, versus Ring 3 for application software) are trustworthy, thus opening a possible target for attack on sensitive information.

However, a conventional system does not provide protection inside the edge devices (e.g. smart cameras), and host system (e.g. video recorders, servers). Protection of confidentiality and integrity of data only when data is in transit over a network or while the data is at rest in a storage device may be insufficient for data such as privacy sensitive data. Such conventional measures are not effective in preventing an attack by a privileged user or compromised system software, and the most common way to gain illicit access to such systems is a vulnerability exploit or stolen credential attack that allows a remote attacker access. Network security solutions do not prevent these attacks. In addition, for video surveillance use cases, piecemeal network and device protections do not enable strong forensic proof of anti-tampering that must be traceable back to the initial camera source.

There may also be a need for authentication of the source of video stream data that purports to be from a particular smart device. Proper authentication of edge device data is particularly important in operations such as a surveillance use case because of the implications of a successful attack on such system.

Although a large of amount of data may be collected by a smart device, only a portion of such data may actually be needed to provide the customer with a particular service. Thus, data that is not required for a service may be unnecessarily exposed to attack during the transmission of such data. For example, a voice assistant only requires that relevant command data to be forwarded to an online service, instead of all conversation that the voice assistant is capturing.

Further, the owner of an algorithm or logic, such as a machine learning model, that is utilized in an edge device may also require assurance that the proprietary algorithm or logic being loaded on edge devices cannot be extracted or stolen by end users who have direct access to the edge device. Software vendors generally do not have a mechanism to attest the identity of an edge device before loading proprietary machine learning models onto such device, and thus cannot fully protect access to the propriety data.

As used herein, "edge device" refers to any device that is capable of providing entry into a network. Edge devices may include, but are not limited to, smart cameras and other smart sensor devices that include network connection.

As used herein, "personally identifiable information" (PII) refers to any information that, when used alone or when with other relevant data, can identify an individual. Privacy sensitive information includes, but is not limited to, PII.

Figure 2:
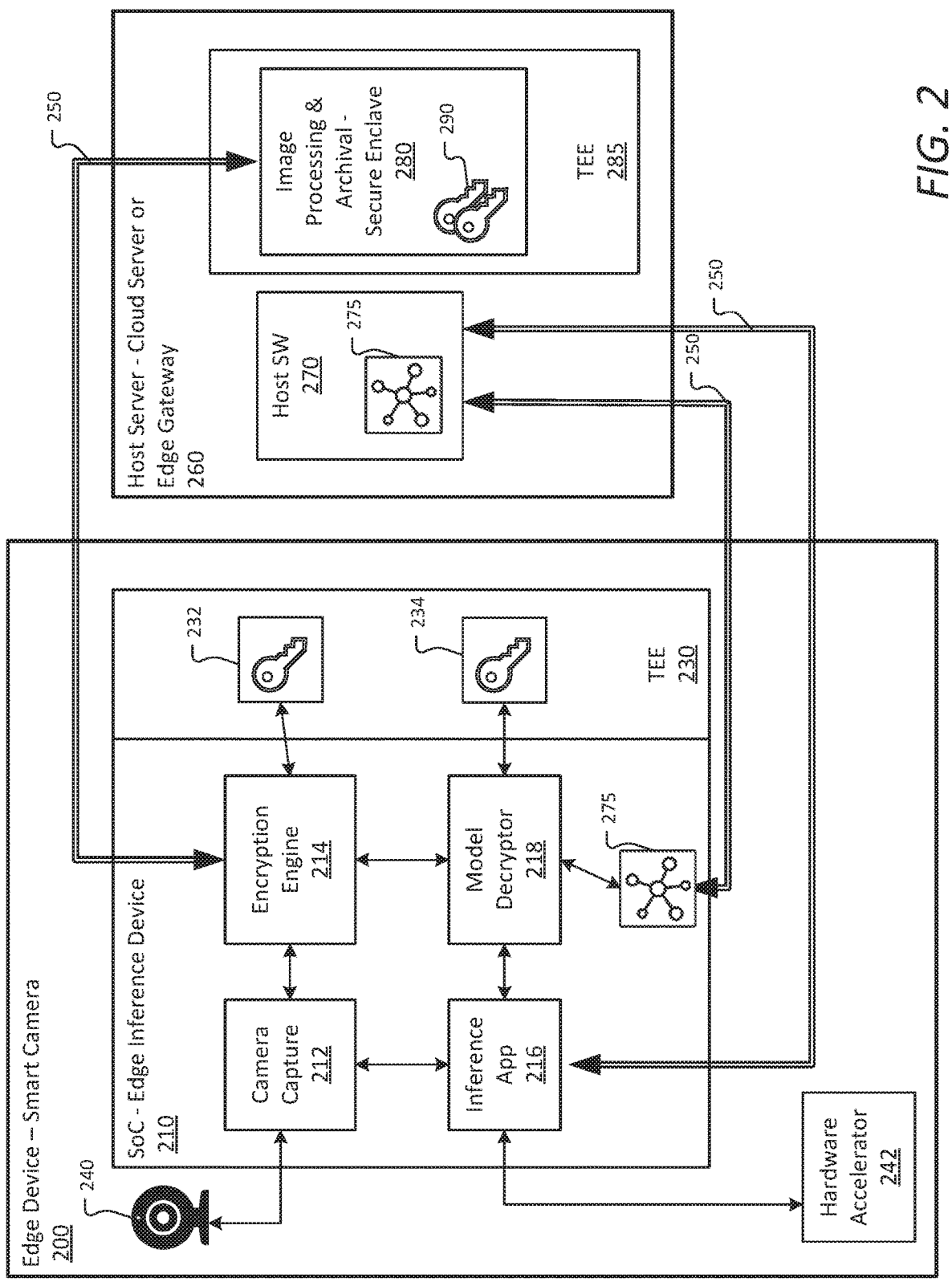
FIG. 2 is an illustration of a system architecture to provide data security for an edge device according to some embodiments.
Figure 3:
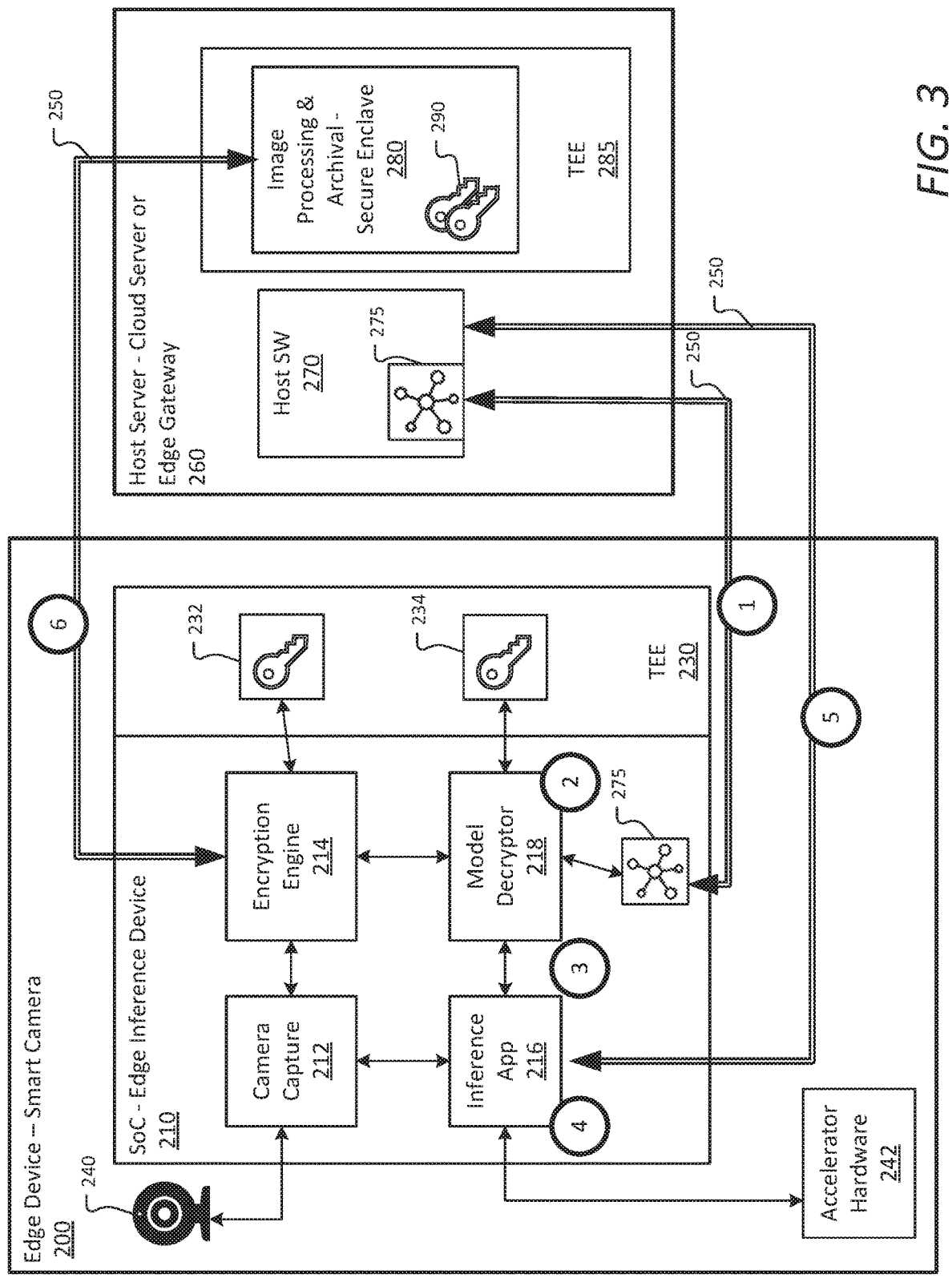
FIG. 3 is an illustration of a process for data security and integrity for an edge device according to some embodiments.
Figure 4:
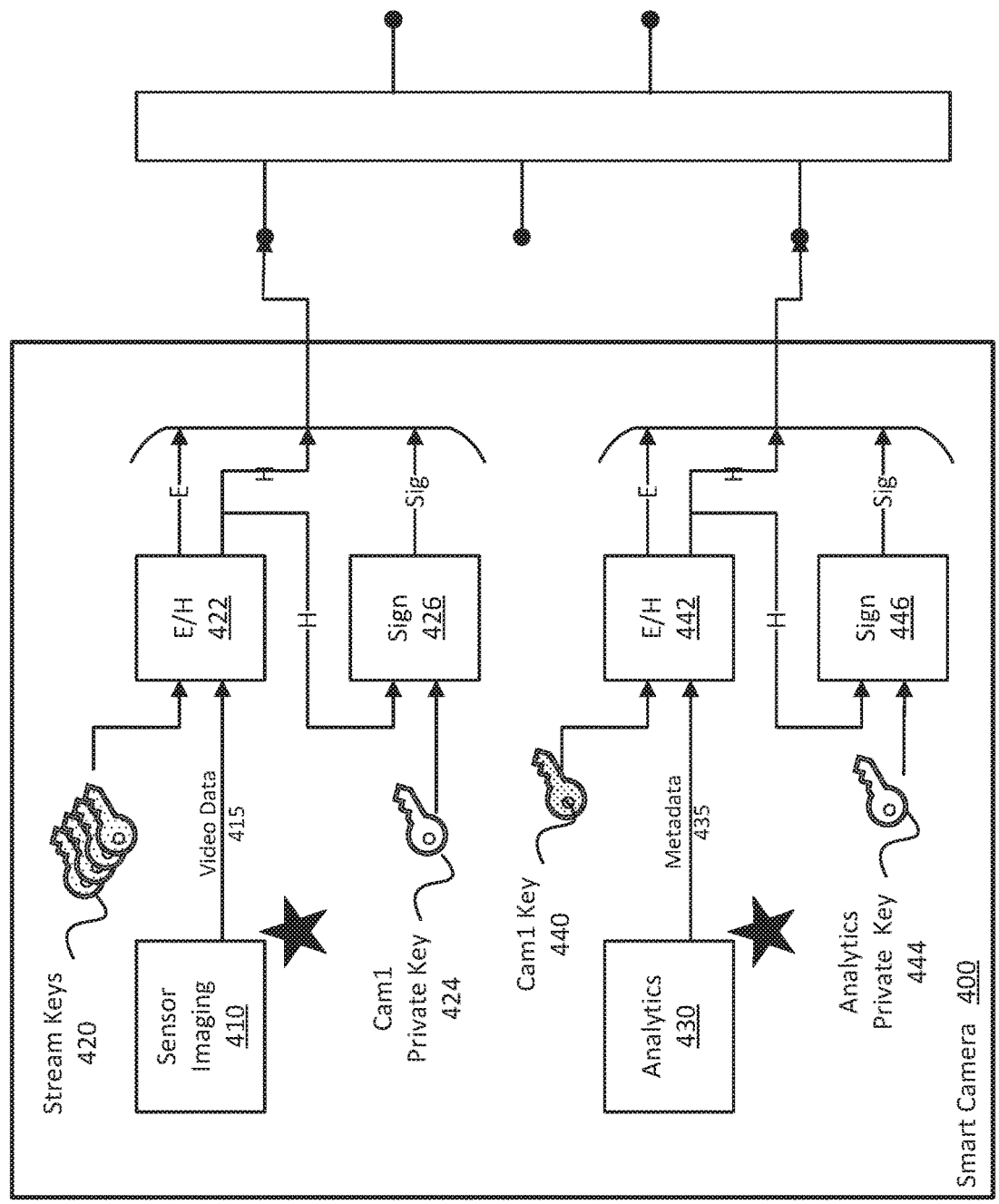
FIG. 4 is an illustration of a smart device to provide protection for privacy sensitive information according to some embodiments.

FIG. 1 is an illustration of a system architecture to provide for data security for smart edge devices according to some embodiments. In some embodiments, an apparatus, system, or process is to apply a strong hardware root of trust to ensure a secure communication channel is formed between trusted software in a smart edge device and in a host system. The two trusted software elements are then to create a secure communication channel for exchanging data. Additional details for an implementation are illustrated in FIGS. 2-4.

As illustrated in FIG. 1, a secure architecture is provided between a smart edge device 110 and a host server 160 to establish one or more secure communication channels 150 between the edge device 110 and a trusted execution environment (TEE) 185 of the host system 160. As illustrated, the edge device 110 includes a sensor device 115, such as a camera, to generate a stream of sensor data, TEE 120 with one or more keys 125 for use in protecting the confidentiality and integrity of data transmissions, and a hardware accelerator 130 to assist in the processing of the sensor data. As used herein, "TEE" refers to a secure area of a processor to guarantee confidentiality and integrity of data. A TEE may include Intel® Software Guard Extensions (SGX) and other technologies.

The edge device 110 may further include a hardware accelerator 130. As used herein, "hardware accelerator" refers to a hardware device structured to provide for efficient processing. In particular, a hardware accelerator may be utilized to provide for offloading of certain processing tasks from a central processing unit (CPU) or other general processor, wherein the hardware accelerator may be intended to provide more efficient processing of the processing tasks than software run on the CPU or other processor.

The host server 160 includes host software 170, and a secure enclave 180 included within the TEE 185, the TEE 185 including keys 190 to enable secure handling of data between the host server 160 and the edge device 110.

In some embodiments, an apparatus or system as illustrated in FIG. 1 provides one or more of the following:

(1) Protecting data of the smart edge device 110 while the data is being actively processed, with such protection being provided both on the edge device 110 and in the backend servers, such as in host server 160.

(2) Signing of a data stream, such as a video streams, using a private key that is strongly tied to the edge device 110, including, but not limited to, a smart camera system, to enable authentication of the data source.

(3) Filtering out privacy sensitive content, including personally identifiable information (PII), or transforming such content to remove personally identifiable features on the edge device 110 to improve user's privacy and reduce cloud service provider's liability in the event of a system compromise.

(4) Protecting an algorithm or logic, such as a machine learning model, that is utilized in the edge device 110, to provide assurance that proprietary algorithms or logic loaded on the edge device 110 cannot be extracted or stolen by end users who have direct access to the edge device, and to protect an operator of an edge device from the loss of proprietary data. In some embodiments, the host system 160 is to use the edge device's public key to encrypt a machine learning model and make the model inaccessible to other unauthorized devices and software, while the edge device 110 can sign data using device-specific keys to enable cryptographic proof of provenance and chain of custody of, for example, video streams for surveillance use cases. A resulting system has improved robustness to snooping and tampering compared to a proprietary piecemeal solution. Additionally, the protections provide better assurance to data controllers and analytics/machine learning IP developers that their assets are protected in deployment.

FIG. 2 is an illustration of a system architecture to provide data security for an edge device according to some embodiments. FIG. 2 illustrates a high-level flow for an example system architecture for an edge device 200, including, for example, a smart camera system, in communication with a host system 260 via one or more secure communication channels 250. In some embodiments, software running in the edge device's TEE 230 and the host system's secure enclave mutually attest each other using a strong hardware root of trust to ensure the one or more secure communication channels formed are between trusted software.

The edge device 200 includes a sensor 240, such as an image sensor in the illustrated example, connected to an edge inference device 210, the edge inference device 210 including an SoC (System on Chip) or other component and that is capable of locally processing video streams. The edge inference device 210 includes a trusted execution environment (TEE) 230. In some embodiments, the edge inference device 210 further includes a hardware accelerator 242. The edge device 200 is connected to a host server 260, illustrated as cloud server or edge gateway in FIG. 2, over a network, and the edge device 200 is to securely transmit video streams (or other data streams) and metadata via the one or more secure communication channels 250.

In some embodiments, the edge inference device 210 includes a camera capture mechanism 212 (or similar mechanism for a different type of data) to capture data from the image sensor and an encryption engine 214 to enable encrypted data streaming, the data stream to be encrypted utilizing a first key 232 of the TEE 230. The edge inference device 210 further includes an inference application 216 to generate inferred data based upon a particular inference model, wherein the TEE includes a second key 234 for decryption of the inference model.

In some embodiments, the host server 260 comprises host software 270, which may include the inference model 275. The server further includes image processing and archival in a secure enclave 280. The secure enclave 280 is within TEE 285 and includes keys 290 for establishing confidentiality and integrity of data.

In some embodiments, the edge device 200 and host server 260 are to provide for protection of the sensor data while the data is being actively processed, with such protection being provided on the edge device 200 and on the host server 260. Further, the edge device 200 is to provide for either or both of signing of the sensor stream using a private key that is strongly tied to the sensor 240 to enable authentication of the sensor 240 as the source of data provided to the host server 260, and signing of analytics metadata using a private key that is strongly tied to analytics of the edge device 200 to enable authentication of the edge device 200 as the source of the analytics.

In some embodiments, the edge device further provides for filtering of the sensor data to remove privacy sensitive content, including personally identifiable information (PII), or transforming such content to remove personally identifiable features on the edge to improve user's privacy and reduce cloud service provider's liability in the event of a system compromise.

FIG. 3 is an illustration of a process for data security and integrity for an edge device according to some embodiments. As illustrated in FIG. 3, a system architecture includes an edge device 200 in communication via secure communication channel 250 with a host server 260. In some embodiments, the edge device 200 and host server 260 are to provide for secure handling of data as follows:

(1) An encrypted ML model 275, such as a model generated by a software vendor, is read from the edge device's local storage or loaded from remote host software, such as the encrypted ML model 275 loaded from host software 270 of host server 260 and received at the edge inference device 210.

(2) The model decryptor 218 is to authenticate and unlock the ML model 275 using a secret key, key 234 of TEE 230.

The secret key 234 for decrypting the model 275 is derived from an attestation process with a hardware root of trust.

(3) The decrypted ML model 275 is loaded into inference software, illustrated as inference application 216 of the edge inference device 210.

(4) The inference application 216 receives and processes a sensor feed, such as a video stream from the camera capture module 212 of the edge inference device 210. In some embodiments, the processing of the sensor feed data is performed at least in part on accelerator hardware 242.

(5) An inference result produced by the inference application 216 is then encrypted and integrity-protected, and then sent to the host software 270 running on the remote host server 260.

(6) If sensor data, such as the video stream data produced by the camera capture 212 of the smart camera 200, is required by the host server 260 for archival or additional processing, the data stream is encrypted and integrity-protected by the encryption engine 214 using secret key 232 in TEE 230, and the encrypted stream is transmitted to the attested secure enclave 280.

In some embodiments, an apparatus, system, or process provides for confidential computing on a host server, or other edge or cloud server. The server may include host server 260 as illustrated in FIGS. 2 and 3. In addition to protections implemented on an edge device, video stream and metadata processing on the host server are also required to maintain the integrity and confidentiality of the data, even when system software is compromised. In some embodiments, the integrity and confidentiality protection is provided by processing all data, including sensor data and generated metadata, in an attested secure enclave 280, such as an Intel SGX enclave, running on the host server 260.

In some embodiments, the edge device 200 remotely requests the host server 260 to send a hardware-measured and hardware-signed quote of the secure enclave's code and data. The edge device 200 is to transfer data from the edge device to the host server only if the attestation by the host server 260 succeeds. This attestation ensures that privacy sensitive data can only be accessed by authorized software, and remains protected from compromised system software of a privileged user.

FIG. 4 is an illustration of a smart device to provide protection for privacy sensitive information and to enable cryptographic proof of provenance according to some embodiments. In conventional devices, video streams and metadata are commonly encrypted before being transmitted to a remote device. However, additional mechanisms beyond conventional use of standard transport layer security (TLS) are required to ensure privacy sensitive information cannot be accessed by a malicious actor on the remote host. These additional mechanisms are described in this section.

In some embodiments, a smart device, such as smart camera 400, is to protect privacy sensitive information that originates on the device. As illustrated in FIG. 4, the smart camera 400 may include sensor imaging 410 to produce a stream of video data 415, and an analytics mechanism 430 to produce a stream of metadata 435. In some embodiments, the video stream 415 in the smart camera 400 (or other sensor stream from an edge device) is encrypted and integrity protected, shown as E/H (Encrypt/Hash)) using a symmetric stream key 420. Outside of the smart camera 400 itself, this stream key 420 is accessible to an attested remote software running inside a secure enclave. In some embodiments, the smart camera 400 is to ensure it is communicating with a genuine software enclave by requesting the host of the secure enclave to send a hardware-signed cryptographic measurement of the enclave's contents before going through a key exchange protocol.

In some embodiments, the video stream 415 is also signed using a private key, shown as Cam1 private key 424 signing 426 hash data H from E/H 422, the private key 424 being derived from a secret fused in the camera device's hardware. This makes it possible to prove that the video stream 415 is physically originated from a specific camera, this being smart camera 400, and not another device impersonating the camera.

In some embodiments, the metadata 435 generated by analytics mechanism 430 is further encrypted and integrity protected, E/H 442, using a key for the camera, Cam 1 key 440, and further signed by an analytics private key, shown as Analytics private key 444 signing 446 hash data H from E/H 442, the private key 444 again being derived from a secret fused in the camera device's hardware.

In some embodiments, to prevent secret keys from being accessed by a compromised system software on the camera platform, all encryption keys are derived, stored, and wielded in a trusted execution environment (TEE) that is separated from the rest of the OS, such as TEE 230 illustrated in FIGS. 2 and 3.

Software vendors that deploy proprietary software such as machine learning inference models may require assurance that the confidentiality of their models is maintained. Further, for safety and security critical applications, including, but not limited to, video surveillance and robotic control, an edge device may be required to ensure that an inference model is signed by a trusted entity before using the inference model for image processing.

To enforce confidentiality of the model, the model is transmitted and stored encrypted using a key that is only accessible by the edge device. More specifically:

(1) The model is encrypted, and optionally authenticated, using a random symmetric key generated on the software vendor's remote machine;

(2) The symmetric key used to encrypt the model is then itself encrypted using the public key of the smart device that is authorized to decrypt and load the model. Optionally, a group signature scheme can be used to use a single public key encryption for multiple devices.

(3) The smart device receives the encrypted model over the network, or reads it from its local storage. The model decryption key is then decrypted using the device's private key.

(4) Finally, the smart device uses the model decryption key to decrypt the model.

To prevent model tampering, the model may be signed using the software vendor's private key, and the edge device verifies the signature using the corresponding public key.

Figure 5:
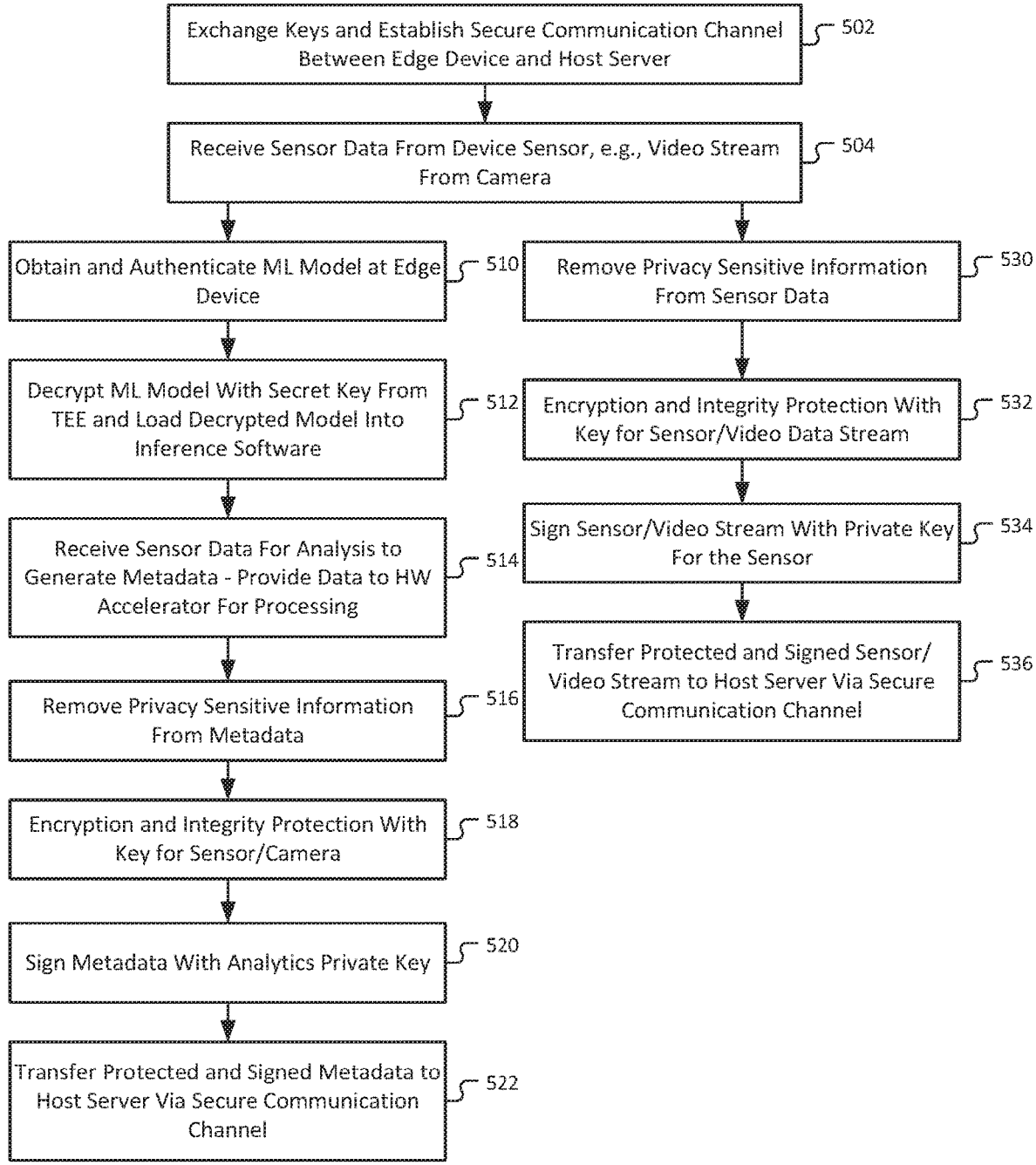
FIG. 5 is a flowchart to illustrate operation for integrity and confidentiality protection in an edge device according to some embodiments.

FIG. 5 is a flowchart to illustrate operation for integrity and confidentiality protection in an edge device according to some embodiments. In some embodiments, one or more secure communication channels are established by an edge device with a host server 502, such as the establishment of secure communication channels 250 between edge device 200 and host server 260 as illustrated in FIGS. 2 and 3. The edge device receives sensor data from a device sensor 504, such as a video stream from an image sensor.

In some embodiments, the edge device is to obtain a machine learning model 510, such as receiving the ML model as encrypted data from the host server via a secure communication channel. In some embodiments, the edge device further to authenticate that the model originates from the host server. The edge device is then to decrypt the ML model with a secret key obtained from a TEE of the edge device, and load the decrypted model into inference software 512. The edge device is to receive the sensor data for analysis to generate inference data/metadata 514, which may include providing data to a hardware accelerator for processing. In some embodiments, the process may include removal of privacy sensitive information from the sensor data or from the generated metadata as required 516, such as limit the data to data that is required for a particular operation.

In some embodiments, the generated metadata is encrypted and integrity protected utilizing a key for the sensor 518, and further the metadata is signed with an analytics private key to authenticate the source of the metadata 520. The edge device is then to transfer the privacy and integrity protected and signed metadata to the host 522.

In some embodiments, such as in implementations in which a host server requires the stream of sensor data for archival or further processing, the edge device may further provide for protection of such data to the host server. In some embodiments, a process may include removal of privacy sensitive information from the sensor data prior to processing of the data 530. The process then may include encryption and integrity protection with a key for the sensor data stream 532, such as a stream key 420 as illustrated in FIG. 4, and for signing the processed data with a private key for the sensor 534, such as the private key for camera Cam1 424 illustrated in FIG. 4. The confidentiality and integrity protected and signed sensor data stream is then transferred to the host server via the secure communication channel established between the edge device and host server 536. It is noted that the use of a key for encryption of the sensor data stream that is different than the key that is used for encryption of the metadata enables the provision of access to the metadata while preserving the confidentiality of the original data stream.

Figure 6:
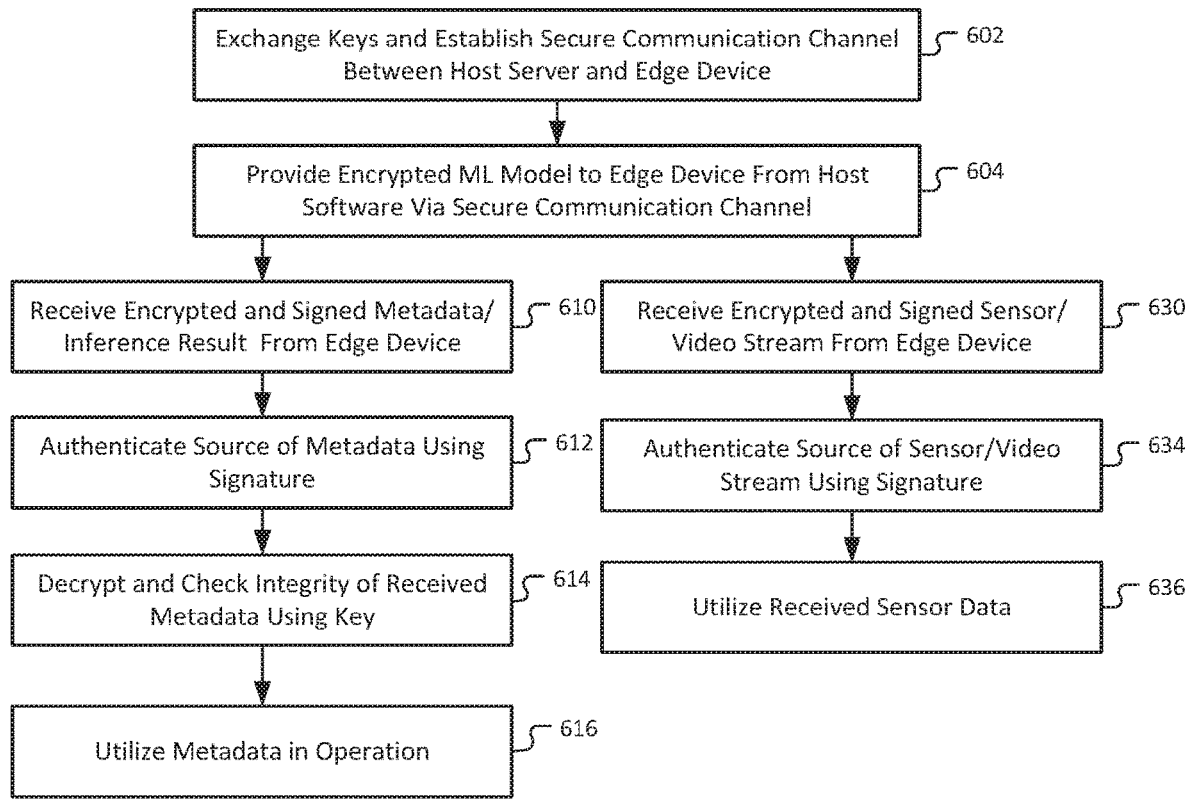
FIG. 6 is a flowchart to illustrate operation for integrity and confidentiality protection in a host server according to some embodiments.

FIG. 6 is a flowchart to illustrate operation for integrity and confidentiality protection in a host server according to some embodiments. In some embodiments, one or more secure communication channels are established by a host server with an edge device 602, such as the establishment of secure communication channels 250 between edge device 200 and host server 260 as illustrated in FIGS. 2 and 3. In some embodiments, the host server is to provide an encrypted machine learning model to the edge device from host software via the established communication channel 604.

In some embodiments, the host server is to receive encrypted and signed inference result (metadata) from the edge device 610, the metadata being generated utilizing the machine learning model provided to the edge device. The host server is further to authenticate that the metadata originates from the edge device utilizing the signature for the metadata 612, and to decrypt and check the integrity of the metadata utilizing a secret key 614, and utilize the metadata as required in operation 616, such as operation to provide surveillance, to provide personal identification, or other use.

In some embodiments, such as in implementations in which the host server requires the stream of sensor data for archival or further processing, the host server may further receive an encrypted and signed sensor data stream from the edge device 630. The host server is to authenticate the source of the sensor data stream using the received signature for the sensor data stream 634 to ensure that the sensor data was generated by the sensor of the edge device. In some embodiments, the host server is then to utilize the stream of sensor data as required 636.

Figure 7:
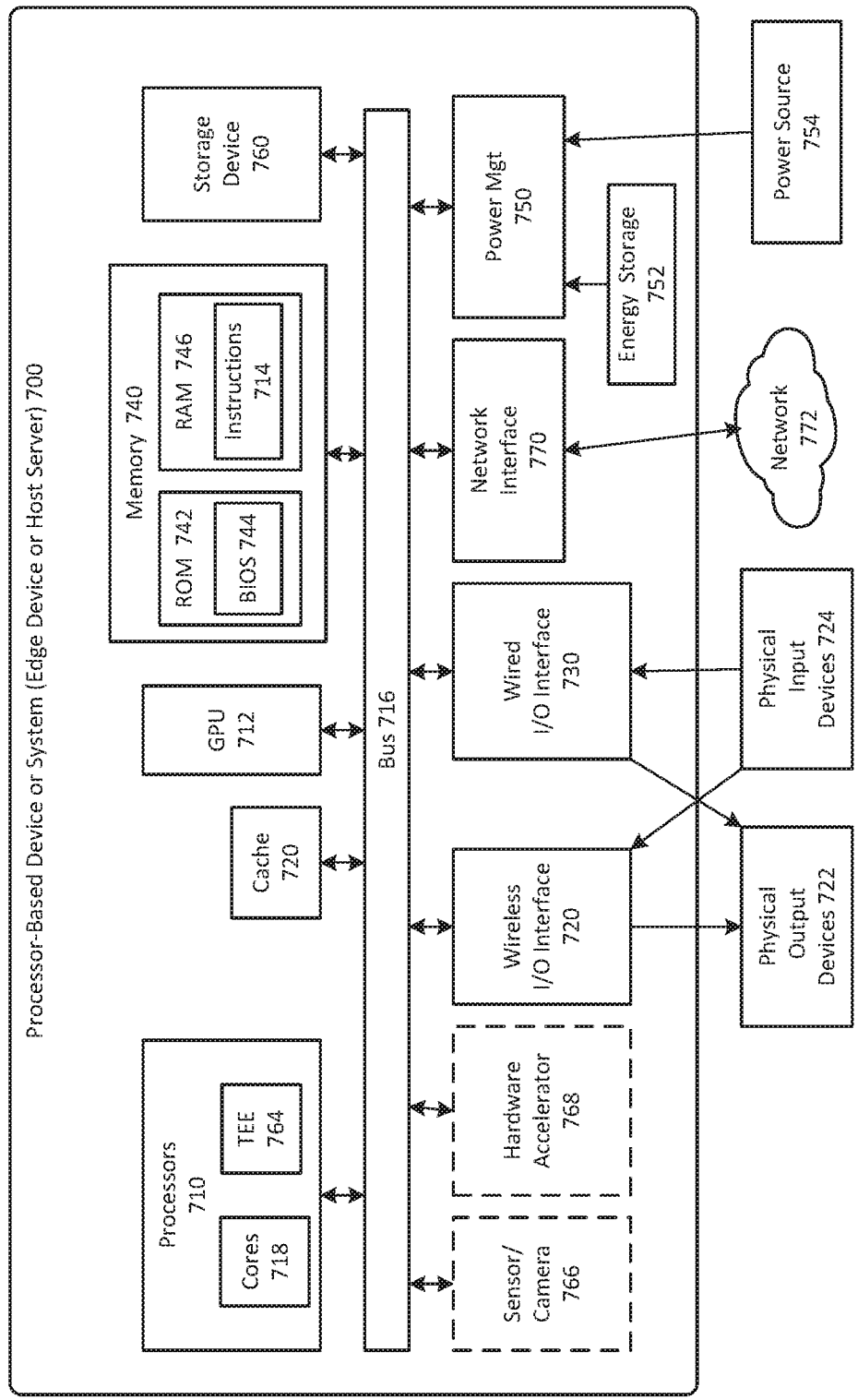
FIG. 7 is a schematic diagram of an illustrative electronic device or system to provide data security and integrity according to some embodiments.

FIG. 7 is a schematic diagram of an illustrative electronic device or system to provide data security and integrity according to some embodiments. The device or system 700 may include either an edge device, such a smart camera, or a host server. The device or system 700 may perform operations as illustrated in one or more of FIGS. 1-6.

In some embodiments, the device or system 700 is an edge device, such as a smart camera including a sensor 766, such as camera, or a host system. The sensor 766 may include the image sensor 240 of edge device 200 illustrated in FIGS. 2 and 3. In some embodiments, the device or system 700 includes a TEE or related security element 764 to enable maintenance of security of data, wherein the security element may include a secure enclave, such as secure enclave 280 of host server 260 illustrated in FIGS. 2 and 3.

In some embodiments, the device or system 700 includes a hardware accelerator 768, such as hardware accelerator 242 of edge device 200 illustrated in FIGS. 2 and 3.

The device or system 700 may additionally include one or more of the following: one or more processors 710 including processor cores 718 and the TEE 764, cache 720, a graphical processing unit (GPU) 712, a wireless input/output (I/O) interface 720, a wired I/O interface 730, memory circuitry 740, power management circuitry 750, non-transitory storage device 760, and a network interface 770 for connection with a network 772. The following discussion provides a brief, general description of the components forming the illustrative device or system 700. Example, non-limiting device or system 700 may include: smart cameras and other edge devices, desktop computing devices, blade server devices, workstations, and similar.

In embodiments, the device or system 700 includes processor cores 718 capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other device or system configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The device or system 700 includes a bus or similar communications link 716 that communicably couples and facilitates the exchange of information and/or data between various system components including the processor cores 718, the cache 720, the graphics processor circuitry 712, one or more wireless I/O interfaces 720, one or more wired I/O interfaces 730, one or more storage devices 760, and/or one or more network interfaces 770. The device or system 700 may be referred to in the singular herein, but this is not intended to limit the embodiments to a single device or system 700, since in certain embodiments, there may be more than one device or system 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPU s); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the device or system 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the device or system 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The device or system 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The device or system 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The device or system 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the device or system 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The device or system 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the device or system 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

In some embodiments, an apparatus includes a sensor to produce a stream of sensor data; an analytics mechanism; and a trusted execution environment (TEE) including a plurality of keys for data security, wherein the apparatus is to exchange keys with a host server to establish one or more secure communication channels between the apparatus and a TEE of a host server, process the stream of sensor data utilizing the analytics mechanism to generate metadata, perform encryption and integrity protection of the metadata utilizing a key from the TEE for the sensor, and sign the metadata utilizing a private key for the analytics mechanism to generate a signature, and transfer the encrypted and integrity protected metadata and the signature to the host server via the one or more secure communication channels.

In some embodiments, the apparatus further includes a hardware accelerator, wherein processing the stream of sensor data includes processing the stream of sensor data at least in part in the hardware accelerator.

In some embodiments, the sensor includes a camera, and the stream of sensor data includes a stream of video data generated by the camera.

In some embodiments, the apparatus further includes a model decryption engine to decrypt an encrypted algorithm for use by the analytics mechanism.

In some embodiments, the apparatus is to receive the encrypted algorithm from the host server via the one or more secure communication channels.

In some embodiments, the apparatus further includes an encryption engine, wherein the apparatus is further to perform encryption and integrity protection of the stream of sensor data utilizing a key from the TEE for the stream of sensor data; sign the stream of sensor data utilizing a private key for the sensor to generate a second signature; and transfer the encrypted and integrity protected sensor data and the second signature to the host server via the one or more secure communication channels.

In some embodiments, the apparatus is further to filter out or transform privacy sensitive content in the stream of sensor data.

In some embodiments, the apparatus is an edge device that is capable of providing entry to a network.

In some embodiments, one or more non-transitory computer-readable storage mediums having stored thereon executable computer program instructions that, when executed by one or more processors, cause the one or more processors to perform operations including receiving a stream of sensor data at an edge device from a sensor; processing the stream of sensor data at the edge device utilizing an analytics mechanism to generate metadata; exchanging keys with a host server to establish one or more secure communication channels between the edge device and a trusted execution environment (TEE) on the host server, the edge device including a TEE including the keys for data security; performing encryption and integrity protection of the metadata utilizing a key from the TEE for the sensor, and signing the metadata utilizing a private key for the analytics mechanism to generate a signature; and transferring the encrypted and integrity protected metadata and the signature to the host server via the one or more secure communication channels.

In some embodiments, processing the stream of sensor data includes processing the stream of sensor data at least in part in a hardware accelerator.

In some embodiments, the sensor includes a camera, and the stream of sensor data includes a stream of video data generated by the camera.

In some embodiments, the one or more mediums include instructions for decrypting an encrypted algorithm for use by the analytics mechanism in processing the stream of sensor data.

In some embodiments, the one or more mediums include instructions for receiving the encrypted algorithm from the host server via the one or more secure communication channels.

In some embodiments, the one or more mediums include instructions for performing encryption and integrity protection of the stream of sensor data utilizing a key from the TEE for the stream of sensor data;

signing the stream of sensor data utilizing a private key for the sensor to generate a second signature; and transferring the encrypted and integrity protected sensor data and the second signature to the host server via the one or more secure communication channels.

In some embodiments, the one or more mediums include instructions for filtering out or transforming privacy sensitive content in the stream of sensor data.

In some embodiments, a system includes one or more processors including a central processing unit (CPU); a memory including host software; and a trusted execution environment (TEE) including a secure enclave, the TEE including a second plurality of keys for data security; and wherein the system is to: exchange keys between the system and an edge device to establish one or more secure communication channels between the edge device and the TEE of the system, receive encrypted and integrity protected metadata and a signature from the edge device via the one or more secure communication channels, the metadata being generated from a stream of video data, authenticate the edge device as a source of the metadata using the signature, and decrypt and check integrity of the metadata using a key from the TEE.

In some embodiments, the system is further to, upon receiving attestation of an identify of the edge device, transfer an encrypted inference model from the host software to the edge device via the one or more secure communication channels.

In some embodiments, the system is further to receive encrypted and integrity protected video data and a second signature from the edge device via the one or more secure communication channels; authenticate a camera of the edge device as a source of the video data using the second signature; and decrypt and check integrity of the video data using a key from the TEE.

In some embodiments, the system is further to utilize the metadata in an operation.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
 a sensor to produce a stream of sensor data;
 an analytics mechanism;
 a decryption engine; and
 a trusted execution environment (TEE) including a plurality of keys for data security, wherein the apparatus is to:
  exchange keys with a host server to establish one or more secure communication channels between the apparatus and a TEE of a host server,
  receive an encrypted algorithm, wherein the apparatus is to receive the encrypted algorithm from the host server via the one or more secure communication channels, wherein the encrypted algorithm is an encrypted machine learning model,
  decrypt the encrypted algorithm with the decryption engine to generate a decrypted algorithm,
  process the stream of sensor data with the analytics mechanism utilizing the decrypted algorithm to generate metadata,
  perform encryption and integrity protection of the metadata utilizing a key from the TEE for the sensor, and sign the metadata utilizing a private key for the analytics mechanism to generate a signature, and
  transfer the encrypted and integrity protected metadata and the signature to the host server via the one or more secure communication channels.

2. The apparatus of claim 1, wherein the apparatus further includes a hardware accelerator, wherein processing the stream of sensor data includes processing the stream of sensor data at least in part in the hardware accelerator.

3. The apparatus of claim 1, wherein the sensor includes a camera, and the stream of sensor data includes a stream of video data generated by the camera.

4. The apparatus of claim 1, further comprising an encryption engine, wherein the apparatus is further to:
 perform encryption and integrity protection of the stream of sensor data utilizing a key from the TEE for the stream of sensor data;
 sign the stream of sensor data utilizing a private key for the sensor to generate a second signature; and
 transfer the encrypted and integrity protected sensor data and the second signature to the host server via the one or more secure communication channels.

5. The apparatus of claim 1, wherein the apparatus is further to filter out or transform privacy sensitive content in the stream of sensor data.

6. The apparatus of claim 1, wherein the apparatus is an edge device that is capable of providing entry to a network.

7. The apparatus of claim 1, wherein the decryption of the encrypted algorithm by the decryption engine is performed using a private key of the apparatus.

8. One or more non-transitory computer-readable storage mediums having stored thereon executable computer program instructions that, when executed by one or more processors, cause the one or more processors to perform operations comprising:

receiving a stream of sensor data at an edge device from a sensor exchanging keys with a host server to establish one or more secure communication channels between the edge device and a trusted execution environment (TEE) on the host server, the edge device including a TEE including the keys for data security;

receiving an encrypted algorithm, the encrypted algorithm being received from the host server via the one or more secure communication channels, wherein the encrypted algorithm is an encrypted machine learning model;

decrypting the encrypted algorithm with a decryption engine to generate a decrypted algorithm;

processing the stream of sensor data at the edge device with an analytics mechanism utilizing the decrypted algorithm to generate metadata;

performing encryption and integrity protection of the metadata utilizing a key from the TEE for the sensor, and signing the metadata utilizing a private key for the analytics mechanism to generate a signature; and transferring the encrypted and integrity protected metadata and the signature to the host server via the one or more secure communication channels.

9. The one or more mediums of claim 8, wherein processing the stream of sensor data includes processing the stream of sensor data at least in part in a hardware accelerator.

10. The one or more mediums of claim 8, wherein the sensor includes a camera, and the stream of sensor data includes a stream of video data generated by the camera.

11. The one or more mediums of claim 8, further comprising instructions for:

performing encryption and integrity protection of the stream of sensor data utilizing a key from the TEE for the stream of sensor data;

signing the stream of sensor data utilizing a private key for the sensor to generate a second signature; and transferring the encrypted and integrity protected sensor data and the second signature to the host server via the one or more secure communication channels.

12. The one or more mediums of claim 8, further comprising instructions for:

filtering out or transforming privacy sensitive content in the stream of sensor data.

13. The one or more mediums of claim 8, wherein decrypting the encrypted algorithm by the decryption engine includes performing the decryption using a private key of the edge device.

* * * * *